United States Patent
Deaton et al.

(10) Patent No.: US 7,869,944 B2
(45) Date of Patent: Jan. 11, 2011

(54) SYSTEMS AND METHODS FOR RECORDING AND REPORTING DATA COLLECTED FROM A REMOTE LOCATION

(75) Inventors: Scott Lowrey Deaton, Tucker, GA (US); Richard Randall Rast, Castle Rock, CO (US)

(73) Assignee: Roof Express, LLC, Centennial, CO (US)

( * ) Notice: Subject to any disclaimer, the term of this patent is extended or adjusted under 35 U.S.C. 154(b) by 1545 days.

(21) Appl. No.: 11/208,389

(22) Filed: Aug. 19, 2005

(65) Prior Publication Data
US 2006/0235611 A1    Oct. 19, 2006

Related U.S. Application Data

(63) Continuation-in-part of application No. 11/108,495, filed on Apr. 18, 2005.

(51) Int. Cl.
*G01C 21/00* (2006.01)
(52) U.S. Cl. ..................................................... 701/207
(58) Field of Classification Search ................. 701/207; 705/8, 400; 709/202
See application file for complete search history.

(56) References Cited

U.S. PATENT DOCUMENTS

| | | | |
|---|---|---|---|
| 5,818,340 A * | 10/1998 | Yankielun et al. | 340/602 |
| 6,319,199 B1 * | 11/2001 | Sheehan et al. | 600/200 |
| 6,581,045 B1 * | 6/2003 | Watson | 705/400 |
| 2002/0032028 A1 * | 3/2002 | Kaupe | 455/427 |
| 2003/0040924 A1 * | 2/2003 | Spoke et al. | 705/1 |
| 2003/0040934 A1 * | 2/2003 | Skidmore et al. | 705/1 |
| 2003/0046003 A1 * | 3/2003 | Smith et al. | 701/213 |
| 2004/0093340 A1 * | 5/2004 | Edmondson et al. | 707/101 |
| 2004/0128313 A1 * | 7/2004 | Whyman | 707/103 R |
| 2004/0138817 A1 * | 7/2004 | Zoken et al. | 702/5 |
| 2004/0220906 A1 * | 11/2004 | Gargi et al. | 707/3 |
| 2004/0243525 A1 * | 12/2004 | Forrester | 705/412 |
| 2004/0260594 A1 * | 12/2004 | Maddox, Jr. | 705/9 |
| 2005/0027588 A1 * | 2/2005 | Current | 705/11 |
| 2005/0228688 A1 * | 10/2005 | Visser et al. | 705/1 |
| 2005/0233295 A1 * | 10/2005 | Chiszar et al. | 434/350 |
| 2006/0060123 A1 * | 3/2006 | Harrie et al. | 114/221 R |
| 2006/0126620 A1 * | 6/2006 | Bonar et al. | 370/389 |
| 2006/0137736 A1 * | 6/2006 | Nishitani et al. | 136/251 |
| 2006/0167971 A1 * | 7/2006 | Breiner | 709/202 |
| 2006/0218005 A1 * | 9/2006 | Villena et al. | 705/1 |

(Continued)

*Primary Examiner*—Khoi Tran
*Assistant Examiner*—Jorge O Peche
(74) *Attorney, Agent, or Firm*—Thomas, Kayden, Horstemeyer & Risley, LLP

(57) ABSTRACT

Systems and methods for recording and reporting data collected from a remote location are disclosed. A work order, defining infrastructure to be inspected at a remote site and including an inspection plan for collecting inspection information, is generated on a first computer system and transferred to a portable computing system. Inspection data is collected pursuant to the inspection plan on the portable computing system. A global positioning system (GPS) receiver associated with the portable computing system provides location information related to inspected infrastructure during the inspection. After collection, inspection data is transferred from the portable computing system to the first and/or to a second computing system for storage and the generation of related reports. The location information obtained during the inspection can be used to determine dimensional measurements of the infrastructure and to generate visual depictions of infrastructure components and defects.

21 Claims, 7 Drawing Sheets

U.S. PATENT DOCUMENTS

2006/0235611 A1* 10/2006 Deaton et al. ............... 701/207
2008/0167825 A1* 7/2008 Tarabzouni et al. ........... 702/36
2008/0306799 A1* 12/2008 Sopko et al. .................... 705/8
2009/0216552 A1* 8/2009 Watrous ........................ 705/1

* cited by examiner

SYSTEMS AND METHODS FOR RECORDING AND REPORTING DATA COLLECTED FROM A REMOTE LOCATION

CROSS-REFERENCE TO RELATED APPLICATION

This application is a continuation-in-part of, and claims priority to, U.S. patent application Ser. No. 11/108,495, entitled, "Systems and Methods for Monitoring and Reporting," filed Apr. 18, 2005, which is entirely incorporated herein by reference.

TECHNICAL FIELD

The present disclosure relates generally to systems and methods for recording and reporting, and more particularly, to systems and methods for recording and reporting data collected from a remote location.

BACKGROUND OF THE INVENTION

Conventional remote recording and reporting systems and methods can be expensive and labor intensive operations. One such situation arises in the recording of information related to the repair and/or replacement of infrastructure at a remote location, and the subsequent generation of reports using this information.

Roof repair and/or replacement projects are one such example of such a labor-intensive operation. First, an inspector (who may be an employee of a roofing contractor, an independent consultant, an employee of a roofing product manufacturer providing roof warranties, among others) is dispatched to the remote building location to provide an assessment of the existing roof. During the assessment, the inspector determines the condition and deficiencies of the building's existing roof. During such an assessment, the inspector may use a pen and paper to take notes as the inspection is carried out. Vast amounts of information can be collected during the inspection and the types and amount of information may vary based on the type of roof being inspected. The types of information collected may be difficult and/or time intensive to record. Non-limiting examples of such information may include measurements of the building perimeter, the location and area of appliances on the surface of the roof, the location of depressions forming ponds and their associated shape, and the locations of roof defects, flashing, seams, drains, vents, and other infrastructure components and features. Furthermore, because the client (e.g., a building owner, building manager or customer) may choose not to participate in the inspection, the inspector may be required to take photographs to substantiate, or otherwise make clear, the types of defects found. Because the images taken with the camera and the inspection notes are unrelated, associating a particular picture with the corresponding infrastructure component, feature, or defect is difficult. Accordingly, when preparing inspection reports, it can be difficult to later match the images with the recorded information.

Once the inspection of the roof is complete, the resulting information can be reviewed to provide recommendations regarding maintenance, repair, and/or replacement of the existing roof to the building owner. Accordingly, a presentation of the assessment findings to the client may be prepared. For example, a report may be generated from the notes and measurements taken during the assessment. The photographs taken during the inspection may also be provided to the client to substantiate the recommendations.

Once the client reviews the assessment findings, a proposal may be requested for the performance of maintenance, repair, and/or replacement of the roof. Again, the proposal includes estimations based upon the information collected during the roof assessment. The hand recorded data from the assessment may be, for example, typed into a spreadsheet or other analysis software.

It should be apparent that a number of opportunities exist for introducing recording errors. For example, the manual recording of the inspection information provides ample opportunities to transpose digits, incorrectly place decimals, use incorrect units, or use non-uniform data, etc. Additionally, because the inspector performing the assessment is not guided through the required assessments, the inspector may accidentally perform incorrect assessments for the type of roof and/or may forget to record information crucial to providing accurate cost estimates. Accordingly, in addition to conventional inspections being a time consuming and labor intensive process, there are several opportunities for the introduction of recording errors. Thus, known manual recording and reporting processes do not address a number of needs.

Therefore, what is needed are alternative systems and methods for recording and reporting which are cost-effective, reduce the opportunities for recording errors, and address the need for faster, more accurate, and reliable on-site assessments.

SUMMARY OF THE INVENTION

One embodiment of a system for recording and reporting collected data includes a server, a client, and a portable computing device. The server is located at a first location and the client is located at a second location. The client further includes a client-server communications interface for communication with the server. The portable computing device is configured for collecting inspection data at a third location according to an inspection plan, the third location being remote from the first and second locations. The portable computing device further includes means for receiving signals for determining the geographic position of the portable computing device, and means for determining the geographic position of the portable computing device from the signals. The geographic position of the portable computing device forms at least a portion of the inspection data collected according to the inspection plan. The portable computing device further includes a memory for storing the inspection data and a bidirectional communications interface for transmitting the inspection data to the client and receiving the inspection plan from the client.

Another embodiment of a roof inspection system may include a portable computing device that can be transported between a first location and a second location, the second location being remote from the first location. The portable computing device includes at least one auxiliary component for collecting roof inspection information at the second remote location according to an inspection plan executed by the portable computing device. The roof inspection information collected by at least one auxiliary component includes geographic positions defining a geometric shape of at least a portion of the roof and a geographic position of at least one component associated with the roof with respect to the portion of the roof. The portable communications device includes a bidirectional communications interface for transferring the roof inspection information from the portable computing device to a second computing device over the bidirectional communications interface at a time when the portable computing device is located at the first location.

Another embodiment may be described as a method for inspecting infrastructure. The method includes collecting inspection information during an infrastructure assessment pursuant to an inspection plan executed by a portable computing device. The infrastructure assessment is conducted at a first location and the step of collecting inspection information includes: receiving at least one signal; determining the location of the portable computing device based on the received signal; associating the location of the portable device with an infrastructure component; and storing the location and an identification of the associated infrastructure component in memory. The method further includes transferring the inspection information from the portable computing device to a second computing device.

Yet another embodiment of a method for inspecting infrastructure includes collecting inspection information during an infrastructure assessment pursuant to an inspection plan executed by a portable computing device, the infrastructure assessment conducted at a first location. The step of collecting inspection information further includes: retrieving an identification of an infrastructure component; assessing the condition of the infrastructure component; associating the assessment with the identification of the infrastructure component; and storing the assessment in memory. The method further includes transferring the inspection information from the portable computing device to a second computing device.

Other systems, methods, components, and advantages of the present invention will be, or will become, apparent to one with skill in the art upon examination of the following drawings and detailed description. It is intended that all such additional systems, methods, components, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENT

Systems and methods for recording and reporting data collected from a remote location are disclosed. In one embodiment, the systems and methods for recording and reporting may be used for the recording and reporting of data related to the assessment of infrastructure, such as roofs, doors and architectural openings, interior and exterior upgrades, mechanical and electrical systems, and other building systems installed, replaced, or upgraded during the lifetime of an associated structure. The systems and methods may also be used in the recording and reporting of data related to the construction of the building itself, such as those performed by a government code inspector or a privately hired building construction inspector. In the context of this application, infrastructure may also relate to other constructed items such as, but not limited to, pavements; electric, gas, water, wastewater, and communication utility distribution systems; and landscaping components such as a lawn, trees, shrubs, flowers, retaining walls and the like.

A number of potential benefits of the systems and methods are, or will become, readily apparent. For example, an inspector for a manufacturer of infrastructure may use the disclosed recording and reporting systems for facilitating a warranty of the infrastructure after installation. In this respect, a manufacturer may require an inspection before, during, and/or after a contractor installs an infrastructure item to be warranted. In such cases, the inspection plans may be adjusted to meet the specifications of a particular manufacturer requiring the inspection. Inspection plans may also be constructed for the performance of periodic preventative maintenance inspections required or suggested by the manufacturer as part of the warranty. The execution of these work orders, and the data associated with it, can be stored as a record for later verification that the conditions of the warranty have been met (e.g. periodic inspections, required owner upkeep, etc.).

In the case of an existing infrastructure having defects, an inspection plan may be executed by an inspector to determine the cause of the defect. The data can then be analyzed and reports generated to assist a client, such as a property manager, in making repair or replacement decisions. For example, reports generated from the information collected during the inspection can provide a report of any defects, as well as the costs of repair of the defects versus replacement of the roof. The report may then be provided to the property manager, who can fully appreciate the extent of the infrastructure defects through pictures and information linked to the defects through a computer-generated, graphical image of the roof. Using the disclosed systems and methods, the property manager can make an informed decision as to whether to repair or replace the infrastructure based on the reports.

Figure 1:
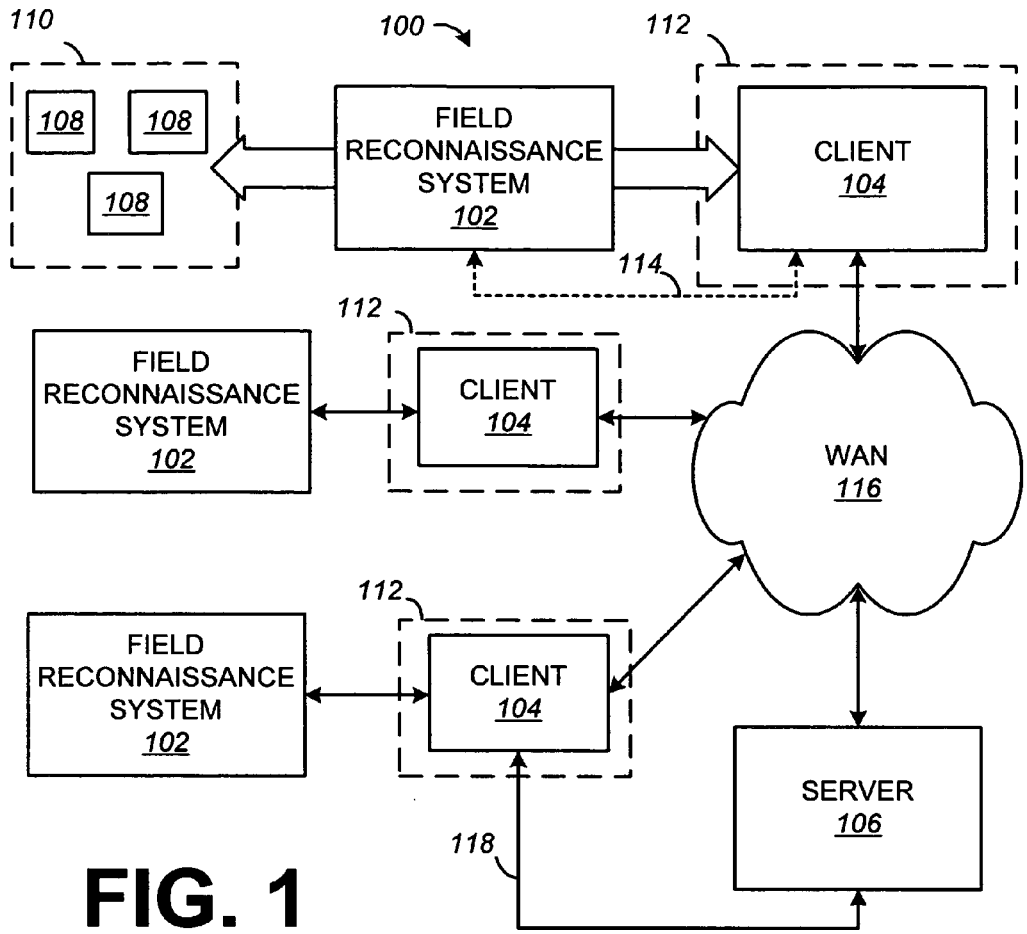
FIG. 1 is a block diagram illustrating an embodiment of a recording and reporting system.

FIG. 1 depicts a block diagram illustrating an exemplary embodiment of a recording and reporting system 100. Recording and reporting system 100 may generally comprise a number of field reconnaissance systems 102, clients 104, and a server system 106. Field reconnaissance system 102 may represent a collection of integrated portable devices (see FIG. 2) used together to collect on-site information relating to one or more targets 108 located at a site 110. Targets 108 may be, for example, components related to an infrastructure system that are the subject of an inspection. In the case that the infrastructure is a roofing system, the components may be the roof itself and/or any related components such as drains, flashing, building components located on the roof (e.g. air conditioning equipment), or any other component and/or feature associated with the roofing system. Accordingly, with respect to infrastructure assessment, the targets may be referred to herein as infrastructure components.

The recording of data related to the remote location may include data collected as a result of an inspection of site 110 and/or target 108. This data collected with respect to an inspection may be referred to as inspection data. The inspection data may include, but is not limited to, data related to tests, observations, and/or measurements related to site 110 and/or target 108. The portability of field reconnaissance system 102 enables the system, or portions of the system, to be physically transported between locations, such as a data collection center 112 and site 110. Although only one site 110 and its associated targets 108 are depicted, it should be understood that the field reconnaissance systems 102 may be transported to any number of sites 110, which may have any number of corresponding targets 108.

Client system 104 may be located remotely from site 110, for example, in data collection center 112. Client system 104 may comprise a computing system configured to synchronize data with field reconnaissance system 102 (e.g., transmit data to, and receive data from, field reconnaissance system 102). For example, the synchronization may occur over a communications interface 114. Communication interface 114 may be bidirectional and include any number of wired or wireless interfaces, such as, but not limited to, a serial or parallel data interface, the universal serial bus (USB) interface, IEEE 1394 (firewire), cellular, or Bluetooth.

In some embodiments, client system 104 may be configured to further transmit the inspection data recorded by field reconnaissance system 102 to server system 106 over a client-server communications interface. For example, client system 104 may transmit the data to server system 106 over a communications interface such as a wide-area network (WAN) 116 and/or over a public switched telephone network (PSTN) 118. WAN 116 may be the Internet, for example. Communication over PSTN 118 may be accomplished using a number of well known analog or digital technologies using telecommunications transceivers (e.g. modems) such as, but not limited to, an integrated services digital network (ISDN) modem.

Server system 106 may be configured to store the data received from the client system 104, analyze the data, and generate a variety of reports. The reports may be stored and/or made accessible to client system 104 via the client-server communications interface. In one embodiment, server system 106 may be a world-wide-web (WWW) server, capable of delivering information to client system 104 via a WWW interface on client system 104. The WWW interface may be a web browser, for example. Accordingly, in such an embodiment, reports may be generated by server system 106 and made accessible to clients 104 through the WWW interface.

Such an embodiment should not be viewed as limiting the storage, analysis, and reporting functions only to server system 106, as some (or all) of these functions could also be performed on client system 104.

Thus, according to one embodiment, a number of functions may be performed on client system 104, while others are performed on server system 106. For example, client 104 may perform a complete or partial analysis of the collected data, and may also generate any associated reports. The results of the analysis may then be stored on server system 106.

Accordingly, it should also be understood that according to some embodiments, recording and reporting system 100 may not include server system 106. Rather, client system 104 may perform some or all of the functions described with respect to server 106. For example, in such an embodiment, client system 104 may perform the functions of storing data (e.g. inspection data, etc.), analyzing data, generating reports from such data, and providing the generated reports to a user. However, one potential benefit of an embodiment using server system 106 for data, storage, analysis, and/or reporting is the ability to provide a subscription based model in which users pay for the ability to access server system 106 for such uses. Centrally locating the reporting functions also enables the ability to update and incorporate features of the reporting system in one location, rather than distributing such changes across a number of client systems 104.

Additionally, storing reports and data in a central location allows such information to be accessible by any computer, local or remote, having suitable connectivity to server system 106. For example, the system 100 may be configured such that interested parties, such as a building owner, may be provided the ability to access server system 106 for the purpose of viewing a number of reports, which may include reports having cost estimates for repair and/or replacement of inspected infrastructure.

Server system 106 may be further configured to provide client system 104 with software updates for field reconnaissance system 102 and/or client system 104 over the data communications interface (e.g., WAN 116 or PSTN 118). Accordingly, a completely distributed recording and reporting system that can be centrally managed and maintained is realized. Now that the system has been described generally, each of the field reconnaissance system 102, client system 104, and server system 106 are described in more detail below.

The Field Reconnaissance System

Figure 2:
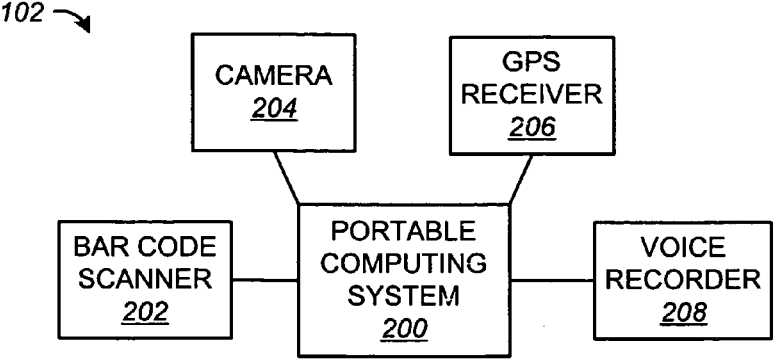
FIG. 2 is a block diagram of an embodiment of the field reconnaissance system of FIG. 1.

FIG. 2 depicts a block diagram of an embodiment of the field reconnaissance system 102 of FIG. 1. Field reconnaissance system 102 may include a portable computing system 200, which, for example, could be a laptop computer or an electronic personal digital assistant (PDA), such as any number of Palm Pilot handheld computing devices manufactured by Palm, Inc. of Milpitas, Calif.

Portable computing system 200 may be configured to guide a user through the process of recording inspection data and synchronize the inspection data with a database after the data has been recorded. Portable computing system 200 also is configured to receive instructions defining the inspections to be completed at specified sites 110 and targets 108. Accordingly, on synchronization, inspection data collected at site 110 may be transmitted to client system 104 from portable computing system 200, and work orders pertaining to future inspections may be received by portable computing system 200 from client system 104.

Field reconnaissance system 102 may also include a number of auxiliary components in communication with portable computing system 200 that are used to assist in the collection of information from targets 108 at site 110. The auxiliary components may include, but are not limited to, a bar code scanner 202, a camera 204, a global positioning system (GPS) receiver 206, and a digital voice recorder 208. Data may be collected manually (e.g. through a user interface), or using the auxiliary components (e.g., bar code scanner 202, camera 204, GPS receiver 206, and voice recorder 208).

The auxiliary components may interface to portable computing system 200 through a wired or wireless connection (e.g., serial, parallel, USB, Firewire, Bluetooth, PCM-CIA, etc.), and portable computing system 200 is configured to collect a variety of recorded data from each of the components. Although several auxiliary components are depicted as being externally attached to portable computing system 200, it should be understood that any portable accessories may be physically integrated within portable computing system 200 as well. In addition to the listed auxiliary components 202-208, portable computing system 200 may be configured to interface with any number of other components depending on the type of data collection being performed. Exemplary components could include laser measuring devices, sonic distance measurement instruments, magnetic reader/recorders and associated identification tags (e.g. Radio Frequency Identification systems), and other devices that can measure and/or record lengths, counts, or inventory.

Figure 3:
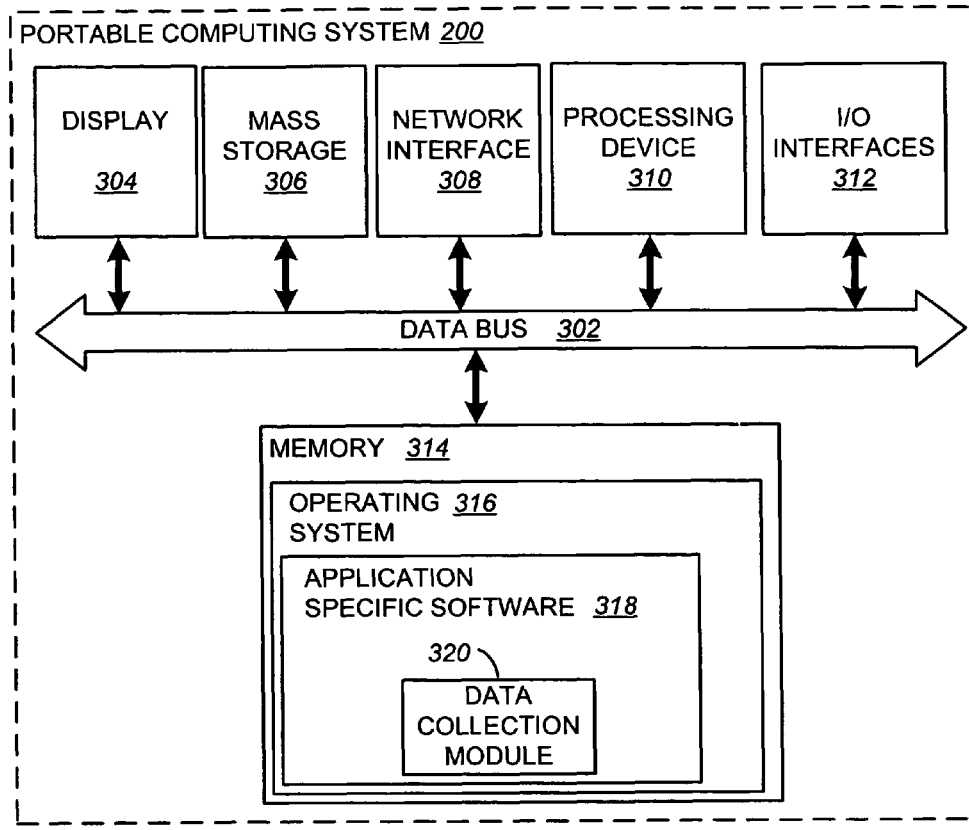
FIG. 3 is a block diagram of the portable computing system of FIG. 2.

FIG. 3 depicts a block diagram of the portable computing system 200 of FIG. 2, which may be programmed, or otherwise configured, to implement a portion of the described recording and reporting system. Portable computing system 200 has been described as portable, generally meaning that portable computing system 200 can be transported between any number of sites 110 and/or targets 108, and data collection center 110. However, generally speaking, portable computing system 200 may comprise any one of a wide variety of wired and/or wireless computing devices, such as a laptop computer, PDA, handheld or hand-based computer, Tablet computer, desktop computer, dedicated server, multiprocessor computing device, cellular telephone, embedded appliance and so forth. Irrespective of its specific arrangement, portable computing system 200 can, for instance, comprise a data bus 302 which may connect to a display 304, mass storage device 306, network interface 308, processing device 310, input/output interfaces 312, and memory 314.

Mass storage device 306 may be, for example, a disk drive, flash memory, or any other of a wide variety of storage devices capable of storing data collected by portable computing device 200. Network interface device 308 comprises various components used to transmit and/or receive data over a wired or wireless network (e.g. a local area network (LAN), wide area network (WAN), piconet, or the Internet). By way of example, the network interface device 308 may include a device that can communicate with both inputs and outputs, for instance, a modulator/demodulator (e.g., a modem), wireless (e.g., radio frequency (RF)) transceiver, a telephonic interface, a bridge, a router, network card, etc. The network interface may also be used to transfer information between the client system 104 and portable computing system 200 (e.g. during synchronization).

Processing device 310 can include any custom made or commercially available processor, a central processing unit (CPU) or auxiliary processor, among several processors associated with the computer system 200, a semiconductor-based microprocessor (in the form of a microchip), a macroprocessor, one or more application specific integrated circuits (ASICs), a plurality of suitably configured digital logic gates, and other well known electrical configurations comprising discreet elements both individually and in various combinations to coordinate the overall operation of the computing system.

Input/output interfaces 312 provide any number of interfaces for the input and output of data. For example, where the portable computing system 200 comprises a personal computer, these components may interface with a user input device (not shown), which may be a keyboard or a mouse. Where the portable computing system 200 comprises a handheld device (e.g., PDA, mobile telephone), these components may interface with function keys or buttons, a touch sensitive screen, a stylus, etc. Display 304 can comprise of a computer monitor or a plasma screen for a PC or a liquid crystal display (LCD) on a handheld device, for example.

Memory 314 can include any one of a combination of volatile memory elements (e.g., random access memory (RAM), such as DRAM, and SRAM, etc.)) and non-volatile memory elements (e.g., ROM, hard drive, tape, CD-ROM, etc.). Memory 314 typically comprises a native operating system 316, one or more native applications, or emulated applications for any of a variety of operating systems and/or emulated hardware platforms, emulated operating systems, etc. For example, the applications may include application specific software 318, which may include a number of executable modules therein. Some exemplary embodiments may include an inspection data collection module 320 for collecting field data. Further, memory 314 may include a number of other executable modules which, for example, could be sub-modules of inspection data collection module 320. One of ordinary skill in the art will appreciate that memory 306 can, and typically will, comprise other components, which have been omitted for purposes of brevity.

Although a number of features of recording and reporting system 100 are described as being contained within an executable module (e.g. inspection data collection module 320), it should be understood that it is not necessary for all described functions to be actually contained within a single executable module. Rather, the functions of "an" executable module may actually be spread across several modules, which may, for example, be sub-modules of each other.

The executable modules may be embodied within a software program, and in the context of this document, a "computer-readable medium" can be essentially anything that can store, communicate, propagate, or transport the program for use by, or in connection with, the instruction execution system, apparatus, or device. The computer-readable medium can be, for example, but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via optical scanning of the paper or other medium, then compiled, interpreted or otherwise processed in a suitable manner if necessary, and then stored in a computer memory.

Figure 4:
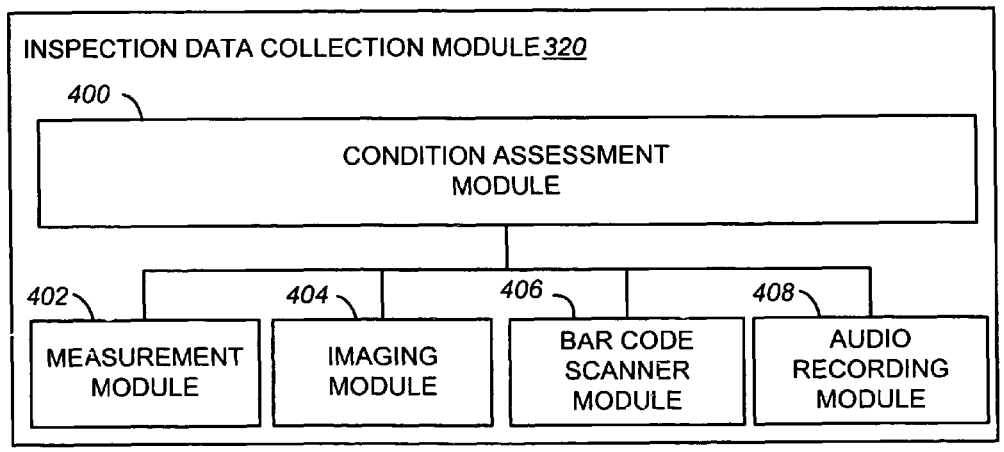
FIG. 4 is a block diagram of the inspection data collection module of FIG. 3.

FIG. 4 depicts a block diagram of the inspection data collection module 320 of FIG. 3. In general, inspection data collection module 320 coordinates the documentation of inspection data collected pursuant to an inspection plan, which may be provided in a downloaded work order. For example, inspection data collection module 320 may include a number of sub-modules such as, but not limited to, a condition assessment module 400, a measurement module 402, an imaging module 404, a bar code scanner module 406, and an audio recording module 408.

In general, condition assessment module 400 provides the functions of managing the collection of the inspection data according to an inspection plan. The inspection plan may, for example, define the type and order of tests, observations, measurements, etc. that should be completed during the inspection. For example, the inspection plan may define how the condition assessment module guides the user through a number of data collecting steps needed to estimate the costs of installation, repair, or replacement of infrastructure. These data collecting steps may differ based on the goals of the inspection (e.g. installation or repair and/or replacement), the type of infrastructure being inspected, and/or the type of materials the infrastructure is constructed of (e.g. built-up membrane, single-ply membrane, asphalt roll roofing, fluid applied membrane, etc.). The data collecting steps may also differ based on any unique features of the target being inspected. For example, in the case of a roof inspection, the data collection steps may differ if the roof includes unique features such as, but not limited to, hatches, skylights, or vents, for example.

Dialog boxes may be displayed within a graphical user interface (GUI) on display 304 and may generally follow the flow of the inspection plan associated with the work order. In many cases, data input may be automated and automatically captured with measurement equipment (e.g., using the auxiliary accessories such as the camera, GPS, voice recorder, etc.) through input/output interface 312. For manual input, a keyboard, mouse, or touch sensitive screen may be used, for example. For manual input, drop-down boxes and check boxes may be used to ensure consistent data entries. Interfaces using freeform text boxes may also be used for the entry of information that requires more flexibility.

Data collected, as well as any other data required for the execution of a work order, may be stored on portable computing system 200 (e.g. within memory 314 or mass storage 306) in any number of ways, including flat files, tables, or relational databases. However, one embodiment of recording and reporting system 100 includes a relational database on the portable computing system 200 for storing the related data. For example, the data may be stored in a SQL Server relational database, and the database can be accessed via any of the executable modules residing on portable computing system 200. One such SQL database system is the SQL Anywhere produced by Sybase, Inc. of Dublin, Calif., which is optimized for computing systems that can benefit from a small footprint.

As described with respect to FIG. 2, field reconnaissance system 102 may include a number of auxiliary components 202-208 used to assist in the collection of data during an inspection of 108 at the site 110. Accordingly, a number of sub-modules within inspection data collection module 320 may be configured to provide condition assessment module 400 with inspection data during the execution of an inspection plan.

For example, measurement module 402 may be used to collect a number of field measurements to document the location of various components associated with the target, or may be used for calculating dimensions and providing data for a graphical representation of a target and components associated with the target. The field measurements may be used for determining quantities of material needed for the installation, replacement, or repair of inspected infrastructure. Information obtained through the measurement module (e.g. assessments, data provided by auxiliary components, etc.) can be associated with the infrastructure targets that are the subject of the inspection. Thus, it should be understood that any data obtained throughout an inspection, including, but not limited to, assessments, measurements, identification information, comments, pictures, and audio recordings, can be advantageously and automatically associated with the infrastructure target being inspected.

A number of commercially available devices may be used for providing measurement module 402 with the measurement data. However, in one embodiment, GPS receiver 206 is used to take the field measurements used by measurement module 402. GPS receiver 206 is capable of receiving signals that can be used to determine the location of the GPS receiver, and thus, the portable computing device. The area, length, position, and quantities of infrastructure targets may be calculated by measurement module 402 with the assistance of GPS receiver 206. Because GPS receiver 206 measures the geographic position of points relative to the Earth's surface, both the distance and a direction of points relative to one another is known.

Figure 5:
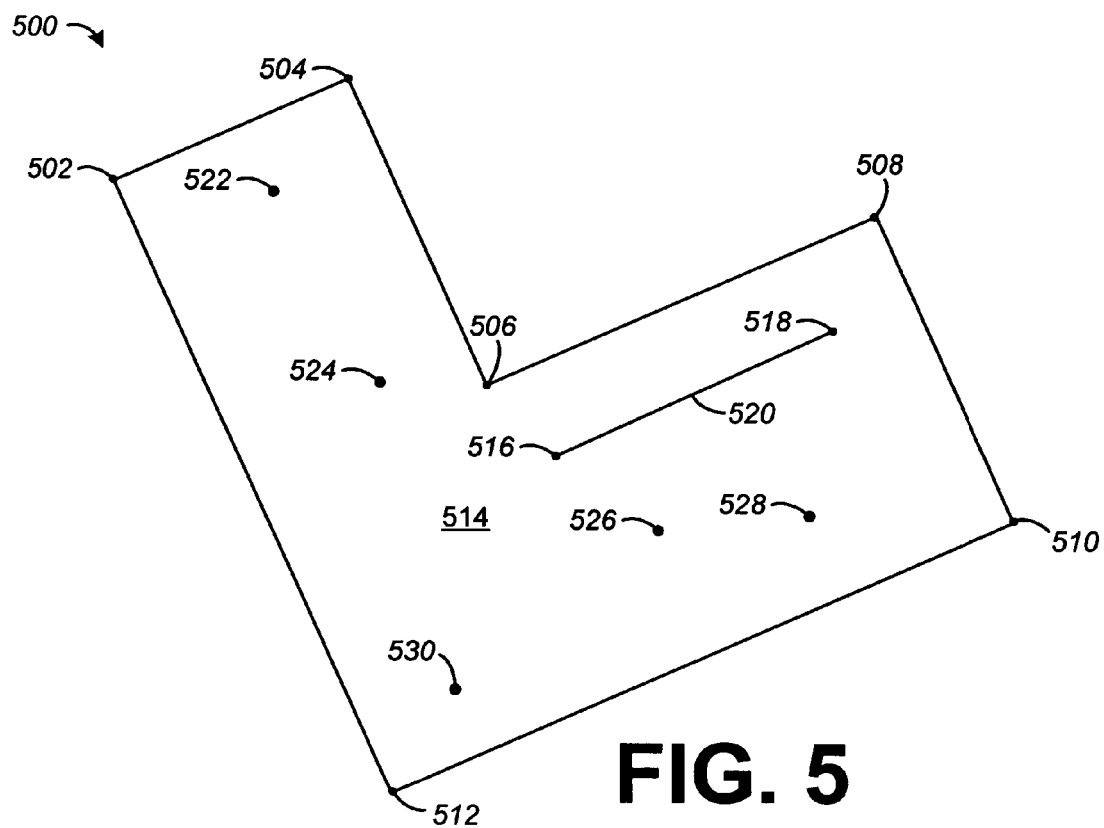
FIG. 5 depicts an overhead view of a roof that may be the subject of an inspection performed with the portable computing system of FIG. 2.

Accordingly, using GPS receiver 206 to record an area of a roof, the user may move the GPS receiver 206 about the roof to record the location of points located on the perimeter of the area to be measured. For example, FIG. 5 depicts an overhead view of a roof 500 located on an L-shaped building. Roof 500 may be a target 108. For the L-shaped building depicted in FIG. 5, an inspector may record the location of the six points 502-512 located at each corner of the area 514 to be measured. These six points are enough to define the perimeter of area 514.

More specifically, to measure the area 514, GPS receiver 206 may be first positioned at point 502. A location measurement is taken by GPS receiver 206 and recorded by measurement module 402. The steps of positioning, measuring, and recording are performed for each of points 504, 506, 508, 510, and 512. Once the relative positions of points 502-512 are known, the area 514 can be calculated.

Area measurements may be calculated for any shape, including regular (e.g. squares, rectangles, circles, ovals, and triangles) and irregular shapes by recording a number of points located around the perimeter of the area. Although six points are recorded in the example of FIG. 5, it should be understood that different shapes may require a larger or smaller number of recorded points to obtain a sufficient estimate of the area. For example, irregular areas to be measured may use a substantially continuous record mode such that the irregular area is traced adequately.

With respect to the roof assessments, the area estimates can be useful for determining the amount of roofing materials needed to construct or reconstruct all, or portions of, the roof. Additionally, in the case that particular areas will not require roofing materials (e.g. in the locations of air handlers, vents, etc.), these areas may be determined and subtracted from the area defined by the perimeter of the roof. It will become apparent that area estimates may be beneficial for a number of purposes such as, but not limited to, estimating the costs associated with removing an existing roof, determining the areas and locations of the roof that will not require roofing materials (e.g. areas where appliances are positioned), and determining the size of defects in the roof (e.g. ponds).

For a linear measurement type, the location of the start and end points of the line are recorded, and the distance between them may be calculated. For example, GPS receiver 206 may be positioned first at point 516 to take a first location measurement. The position of point 516 is recorded by personal computing system 200. Next, GPS receiver 206 is positioned at point 518 to take the second location measurement. Once the positions are determined, the distance between the points can be calculated. It should be understood that, although one line is depicted, the location of any number of connected points may be measured by GPS receiver 206. The distances between the connected points may be added to determine a total length between a starting and ending point on a line. Additionally, although line 520 is depicted as a straight line, the distance of any line, whether regular or irregular, may be determined. It should be understood that an irregular line may require a substantial number of additional point recordings than a straight line. Linear measurements may be useful, for example, in determining quantities of flashing or gutters, drainage piping, roof walkways, or any other linear feature. Additionally, linear measurements can be used for quantifying lengths of defective materials including, but not limited to, damaged or missing flashing, gutter, or seam splits on roof membranes.

Point measurements may be taken that represent the location of an infrastructure component or related feature that may be measured by GPS receiver 206 and recorded by personal computing device 200. For example, looking again to FIG. 5, each of points 522-530 may represent the location of an infrastructure component or an infrastructure feature measured by the GPS. The location of the infrastructure component can be, for example, the location of roof vents, roof drains, plumbing vents, electrical or air conditioning equipment, radio or satellite receiver/transmitters, building equipment, or other objects associated with a roof system. The location of the infrastructure feature could be, for example, the location of an infrastructure defect, such as damage to a roof membrane or other roof component. In addition to measuring the position of points, a quantity of infrastructure components and/or features can be derived from the number of points taken. For example, the inspection plan may request that the inspector mark the location of each plumbing vent located on the roof. The total number of locations recorded yields the quantity of plumbing vents.

Additionally, according to one embodiment, GPS receiver 206 may interface with portable computing system 200 to provide an inspector with detailed travel instructions to a site and/or target associated with a particular work order. Such an embodiment may enable inspectors to find sites and/or targets without the need for paper maps or driving directions. Even further, if the site 110 and/or target 108 has already been inspected, the previously recorded location data may be used to locate infrastructure components and features at the site 110 and/or target 108. For example, GPS receiver 206 may provide portable computing system 200 with the current position of the GPS receiver 206, allowing portable computing system 200 to compute and provide directions (e.g. via audio prompts or visual directions) to the location of the desired infrastructure component or feature.

GPS receiver 206 may also be used to confirm the location of a particular site 110 and/or target 108 associated with a downloaded work order. For example, during the execution of an inspection plan, the reading of the GPS location may be compared to a known location of a particular site 110 and/or target 108. If the GPS receiver 206 is not located within a predefined distance of the site 110 and/or target 108, inspection data collection module 320 may be configured to warn the inspector. In some embodiments the inspection data collection module 320 may prevent the inspector from taking any readings until the GPS receiver 206 is located within the predefined distance, thereby ensuring that the inspection is being performed on the correct site 110 and/or target 108.

In addition to requesting position information, condition assessment module 400 may request a number of images to be taken using imaging module 404. For example, the condition assessment module may be configured to request that that an infrastructure component or feature, such as an infrastructure component needing repair or replacement (e.g. a defective roof vent) be documented via an image. The image, for example, may be supplied using camera 204. Camera 204, which may be a digital camera, may be used to take a picture of the component or component feature associated with data collected at a site and/or target. For example, images taken by camera 204 may be useful for documenting defects (or subsequent repair) of an infrastructure feature. In some embodiments, camera 204 may be an infrared camera capable of taking infrared images. For example, infrared images may be analyzed to detect moisture issues with a particular infrastructure component. The images taken by camera 204 can be linked, or otherwise associated with, other data collected during an inspection. In one embodiment, an inspector may categorize the nature and description of a defect through an interface displayed by inspection data collection module 320. The defect is then linked to the identification of the infrastructure component. Then, condition assessment module 400 may request that a photograph of the infrastructure component having the defect be taken using camera 204. This photograph can be automatically linked to the component and the associated description of the defect. Accordingly, using GPS receiver 206, the location of the infrastructure component can also be recorded using measurement module 402 as described above. Thus, in the case that the infrastructure component is a defective vent, the vent may be documented with its location, a description of the defect, the severity of the defect, and an image of the defect. In addition to using the image for later review (e.g. to determine the severity of damage), any other person not able to personally inspect the roof can be provided with a virtual tour of the inspection.

Condition assessment module 400 may also collect data through bar code scanner module 406. Bar code scanner module 406 may be used to collect static information during the execution of a work order. Bar code scanner module 406 may use bar code scanner 202, for example, to read a bar code label representing an identification of a site and/or target such that subsequent inspections of the site and/or target can be properly associated with previous inspections. That is, naming conventions can be standardized using the bar codes, increasing the chance that the collected data will be properly associated with data previously saved and recorded for a given site and/or target. Accordingly, the inspections may be performed in an interactive manner, and the data can be successfully integrated without the chance of a target's or site's identifier being mismatched between inspections. Additionally, an inspector may carry a collection of bar codes associated with products that may be used for the repair and/or replacement of objects located at the target being inspected. For example, bar codes may exist for identifying a type of roofing material that may be applied, as well as equipment or other infrastructure components located on the roof surface Bar codes may also be used to quickly record data that is gathered on a repetitive basis to develop historical trend information for roof infrastructure management or maintenance. Such trend information may be collected during each inspection and later analyzed for predicting the frequency of future inspection and/or maintenance. For example, a bar code might be applied to an infrastructure feature such as a roof drain. The drain may be inspected on a periodic basis (e.g. every three months) for obstructions such as leaves, soil or other debris. The inspector can scan the bar-code associated with and identifying the drain and provide an assessment of the drain's current condition. For example, the condition assessment may indicate the degree of obstruction. This data can then be stored to provide a history of the maintenance performed on the drain. Such historical data, which may be stored in server database module 722, may be analyzed to estimate how often a particular drain should be maintained (e.g. cleaned). The historical data may also indicate that the predicted drain maintenance is seasonal. For example, the historical data may reflect that the maintenance is only needed after the Fall season.

Audio recording module 408 may be used by condition assessment module 400 to record voice annotations, or other sounds, during the execution of a work order. Audio recording module 408 may record the audio using voice recorder 208, which may be a digital voice recorder. The audio may, for example, be associated with a particular site, infrastructure component, or infrastructure feature. In addition to voice annotations, the recorded sounds could include the documentation of sounds associated with infrastructure components, such as faulty equipment. These sounds can be used for later diagnosing or detecting a problem with the infrastructure component.

In addition to the listed modules 402-408, inspection data collection module 320 may be configured to interface with any number of other modules depending on the type of monitoring being performed. For example, these modules may be used to collect inspection data from a wide variety of auxiliary devices that may be interfaced with portable computing device 200. Such devices may, for example, be laser measuring devices, sonic distance measurement instruments, magnetic reader/recorders and associated identification tags, and other devices that can measure and record lengths, counts or inventory.

In some embodiments, such as when recording and reporting system 100 is used for applications where GPS measurements are not practical (e.g. locations obstructed from satellite reception) a number of other devices may be used to calculate the relative distances between points. For example, a number of ground-based, or satellite-based, position sensing devices are widely available. Devices providing the capability of determining the spatial relationship between points, including the relative directions and distances, provide a number of advantages. For example, data collected representing these spatial relationships can assist in providing graphical models of a particular target.

Once inspection data has been recorded through inspection data collection module 320, the inspection data may be transferred to client system 104 through client conduit module 620. Accordingly, client conduit module 620 is configured to communicate with portable computing system 200. Upon an indication to synchronize information with the client system 104, the client conduit module 620 is configured to transfer the information between client system 104 and portable computing system 200 via a wired or wireless connection during synchronization. For example, the indication may be signaled by docking/connecting (physically or logically) the portable computing system 200 to base-station client system 104 or by pressing a synchronization button or key-sequence on the portable computing system, the client system 104, or a portable computing system docking station (not shown). During synchronization, personal computing system 200 may transfer collected inspection data to client system 104, and client system 104 may transfer a number of work orders or other data (e.g., software updates) to portable computing system 200.

The Client System

Figure 6:
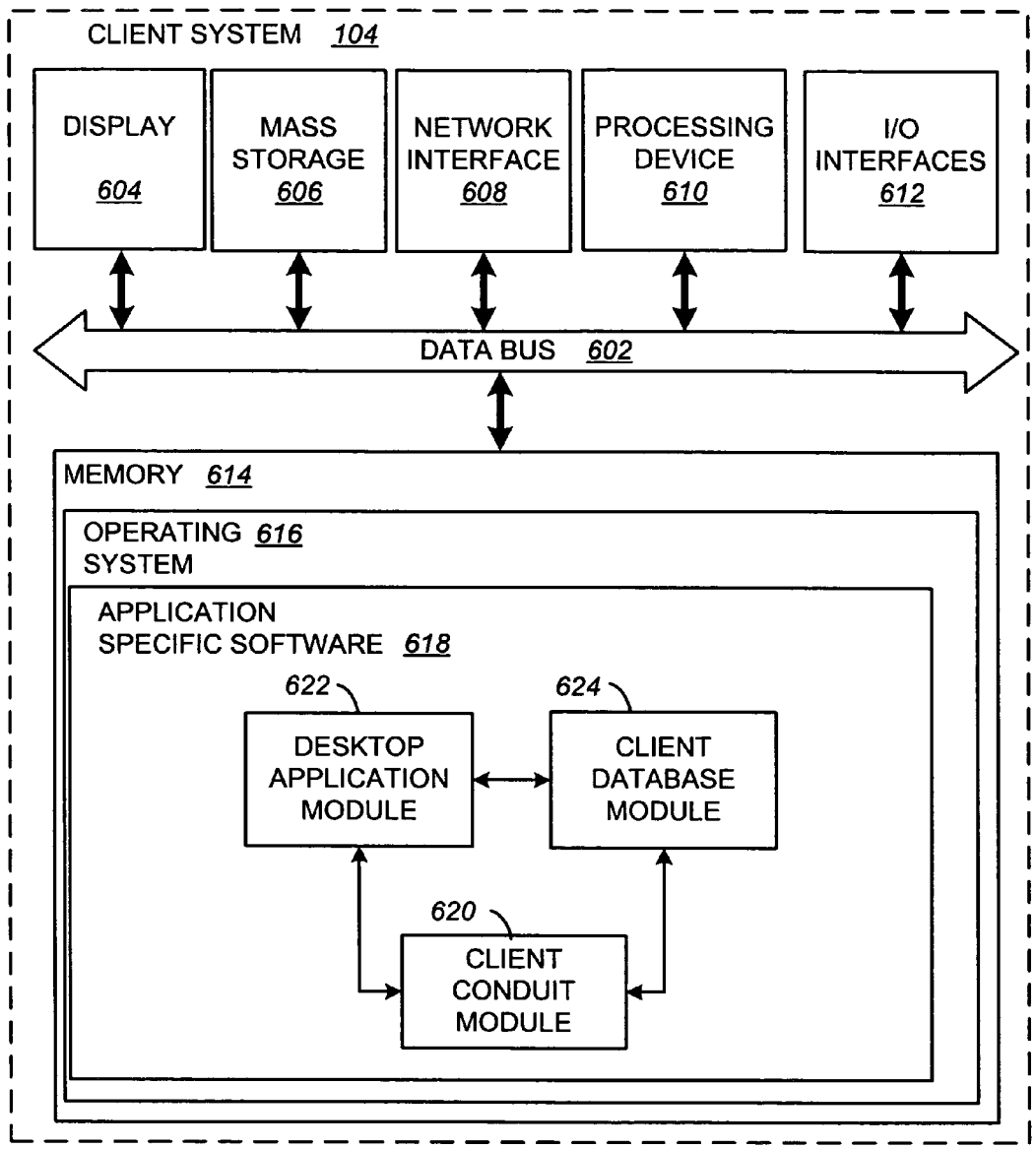
FIG. 6 is a block diagram of the client system of FIG. 2.

Now that field reconnaissance system 102 has been generally described, the features of client system 104 are described with respect to FIG. 6. Specifically, client system 104 may also comprise a computer system similar to that used by portable computing system 200, described above and referenced in FIG. 3. Accordingly, the details of the system architecture are not repeated. However, it should be understood that client system 104 includes similar components, such as, but not limited to a data bus 602, a display 604, mass storage 606, network interface device 608, a processing device 610, memory 614, and input/output interfaces 612.

Memory 614 of client system 104 may include an operating system 616 and application specific software 618 residing therein. Further, memory 614 may include application specific software 618, which may comprise a number of executable modules, including, but not limited to, a client conduit module 620, a desktop application module 622, and a client database module 624, each of which are described in more detail below. It should be emphasized that, although each of the modules are depicted as separate modules for the sake of clearly setting forth the functions provided by client system 104, some embodiments of the system may split or combine the functions of each module or sub-module into other executable modules.

Client conduit module 620 is configured to facilitate the transfer of information between client system 104 and portable computing system 200. Specifically, client conduit module 620 interfaces with the portable computing device 200. Upon detecting an indication to synchronize information with the portable computing system 200, client conduit module 620 and portable computing device 200 coordinate to transfer information to and from the portable computing system 200 and client system 104. Client conduit module 620 may interface with client database module 624 for storing information transferred from portable computing device 200. This information, for example, may be the inspection data recorded during an inspection.

Client database module 624 may be optionally integrated within client system 104. In general, client database module 624 may be configured to interface with any other executable modules on client system 104 as needed, for the purpose of storing and retrieving related data in an associated database. The related data may include data used for other modules, local or remote from client system 104, to automatically generate line drawings, create cost estimates, work-orders for repair, reports, and proposals.

In some embodiments, data stored in client database module 624 may be stored only temporarily (e.g., until the data can be later synchronized with either portable computing system 200 or server system 106). For example, client database module 624 may store work orders transferred from server system 106. These work orders may persist within the client database module 624 until synchronized with, and thus transferred to, portable computing system 200. Accordingly, once the work orders are uploaded to portable computing system 200, this data may be deleted from the database associated with client database module 624. Likewise, client database module 624 may store and retrieve inspection data transferred from the portable computing system 200. The inspection data may persist within the database associated with client database module 624 until the information is transferred from client system 104 to server system 106. This model may be advantageous, for example, in that it does not require that client system 104 maintain real-time access to server system 106. Rather, the transfer of data may be scheduled between client system 104 and server system 106 during a number of designated transfer periods.

In some embodiments, client system 104 may not include a client database module or an associated database. In such an embodiment, desktop application module 622 may transfer data between field reconnaissance system 200 and server 104 without first storing the data for any substantial amount of time within a database on client system 104. This model may be beneficial in keeping the system complexity low, and reducing the risk of data loss between the portable computing system 200 and system server system 106.

Now that client database module 624 has been described, the functions of desktop application module 622 are described in more detail. In general, desktop application module 622 provides a user interface for user management and access of the recording and reporting system. For example, desktop application module 622 may be a web based interface capable of accessing content from a WWW server residing on server system 106. For example, desktop application module 622 may be a WWW browser such as Internet Explorer, distributed by Microsoft Corp., Redmond, Wash. Accordingly, in effect, desktop application module 622 provides the user interface for accessing a number of functions provided by server 106.

Desktop application module 622 interfaces with server system 104 for synchronizing data between server system 106 and client system 104. Accordingly, desktop application module 622 may transfer data directly between client conduit module 620 and server system 106. For example, upon a synchronization between portable computing device 200 and client system 104, client conduit module 620 may transfer inspection data directly to system 104. Client system 104 may then pass the inspection data to server system 106. Likewise, work orders may be transferred from server system 106 to client system 104 through desktop application module 622. Desktop application module 622 may then pass the work order to client conduit module 620, which then passes the work order to portable computing device 200.

The Server System

Figure 7:
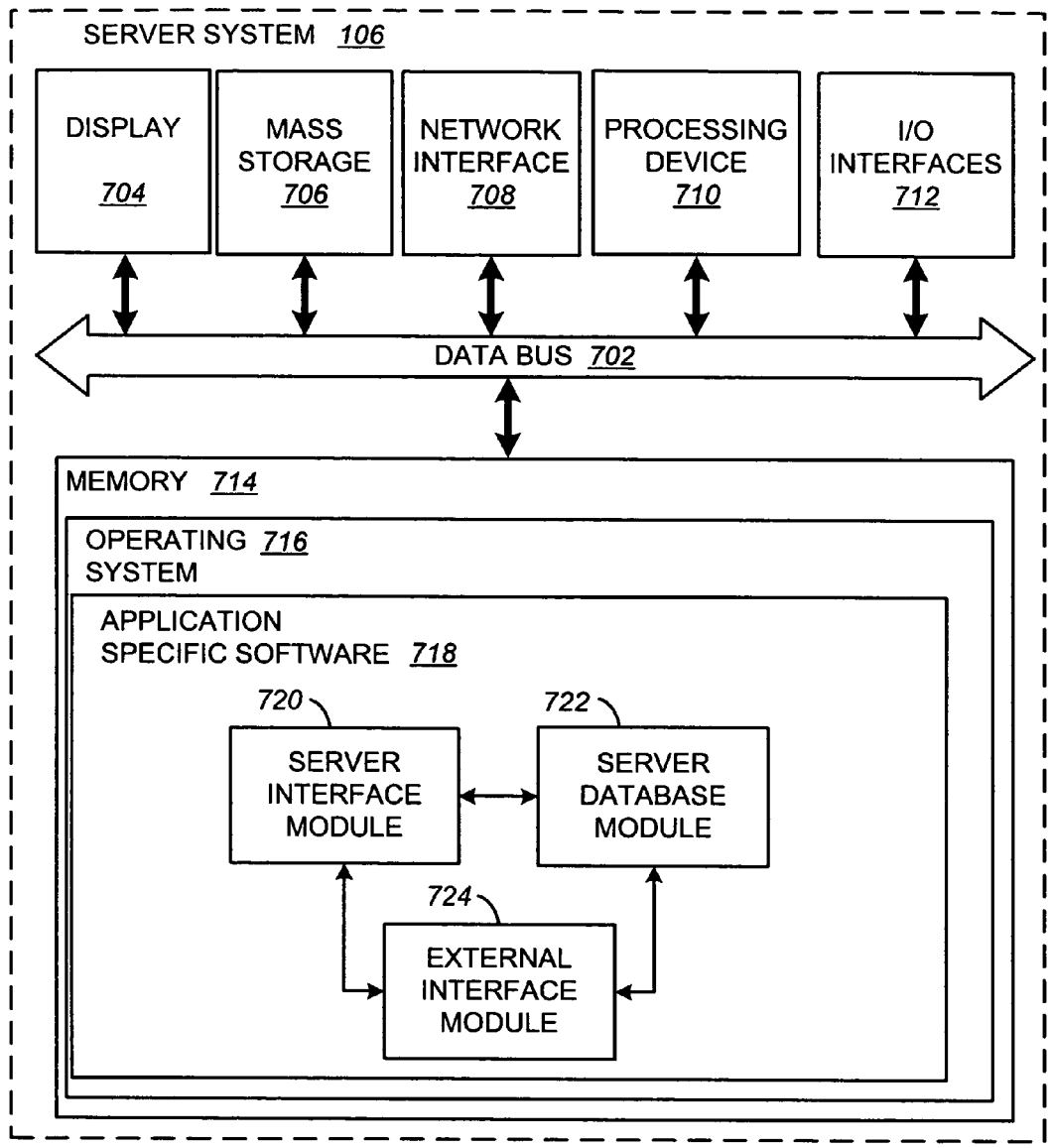
FIG. 7 is a block diagram of the server system of FIG. 2.

Now that client system 104 has been generally described, the features of server system 106 are described with respect to FIG. 7. Specifically, server system 106 may also comprise a computer system similar to that used by portable computing system 200 and/or client system 104, described above and referenced in FIGS. 3 and 6. Accordingly, the details of the system architecture are not repeated. However, it should be understood that server system 106 includes similar components, such as, but not limited to, a data bus 702, a display 704, mass storage 706, network interface device 708, a processing device 710, memory 714, and input/output interfaces 712. Similarly, memory 714 of server system 106 may include an operating system 716 residing therein. Further, memory 714 may include application specific software 718, which may comprise a number of executable modules, including, but not limited to, a server interface module 720, a server database module 722, and an external interface module 724, each of which are described in more detail below. It should be emphasized that, although each of the modules are depicted as separate modules for the sake of clearly setting forth the functions provided by server system 106, some embodiments of server system 106 may split or combine the functions of each module or sub-module into other executable modules.

Figure 8:
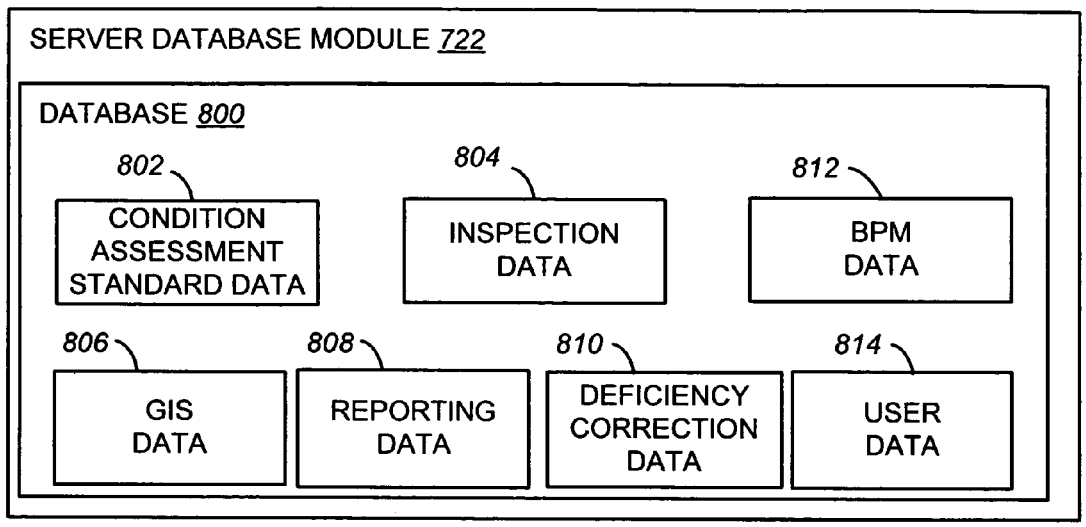
FIG. 8 is a block diagram of the server database module of FIG. 7.

Looking now to FIG. 8, server database module 722 stores data related to the recording and reporting system in an associated database 800. The information collected and stored for retrieval by server database module 722 may be stored within mass storage 706 of server system 106, or within any other storage device located remote or local from server system 106. Other executable modules are provided with the capability of accessing, storing, or updating data in the database through server database module 722. The associated database may be comprised of one or more flat files, tables, or relational databases, for example. In one embodiment, the related data is stored on server system 106 within structured query language (SQL) relational database, such as the SQL Server Database Environment produced by Microsoft Corp., Redmond, Wash.

In one embodiment, each entity (e.g. site, target, inspector, etc.) has its own table in the database, and individual records are stored within each respective table for the entity. Each target belongs to a specific site, and thus, a relationship exists between these entities and this relationship is maintained by the relational database. In the described embodiment, if a site record is deleted, then it follows that all records associated with the deleted site may also be deleted (e.g. target information for that site, etc.). On the other hand, if a site record is updated, then all records associated with the site may be updated.

Database 800 may store any data related to recording and reporting system 100 such as data related for work orders, inspection plans, inspectors, and target and/or site information. However, generally speaking, the data stored in database 800 by server database module 727 may be generally separated into five non-limiting categories: condition assessment standard data 802, inspection data 804, geographic information system (GIS) data 806, reporting data 808, deficiency correction data 810, building product manufacturer (BPM) data 812, and user data 814. Each of these categories is described in more detail below.

Data recording and reporting system 100 may analyze collected assessment data by comparing the collected assessment data to predefined standards data. In the context of roofing assessments, one such set of predefined standards was originally developed for the United States Army Corps of Engineers as part of a tri-service initiative called the "Fence to Fence Condition Assessment Program" (ACAP). The standards may be modified over time as needed, such as to conform with industry practice, government regulations, and building codes. Accordingly, said another way, condition assessment standard data 802 may represent a structured list of standards against which field assessments may be compared. The condition assessment standards data may be used to analyze the collected assessment data by taking into consideration the type of infrastructure, the type of defect, and the severity of the defect.

For example, a common defect in infrastructure such as a single-ply, synthetic roof (e.g. an ethylene propylene diene monomer (EPDM) roof or a thermoplastic polyolefin (TPO) roof) is a seam split. The inspection standards provide a way to assess the severity of the split with respect to the type of roof (e.g. EPDM vs. TPO). The severity may, for example, be determined based on the physical attributes, such as the length and/or width of the seam split. Another exemplary defect is blistering, which occurs frequently in built-up asphalt based roofs or modified bitumen roofs. The standards may categorize the severity of the blistering based on, for example, a measurement of the area of the blistering. Accordingly, the inspection standards allow consistent inspections from one roof to another, and from one inspector to another. This consistency is greatly beneficial in developing trend information and predicting proper maintenance, repair and the eventual replacement of roofing components or the entire roof system.

Inspection data 804 may include data collected by an inspector using field reconnaissance system 102, or may be data input manually via a user interface (e.g. via a web-based browser) through client system 104. Inspection data may be entered manually in the case that some data was not entered in the field, for corrections, or if additional notes are warranted, for example. Manually entered inspection data could also include any associated digital images, audio recordings, etc.

For inspection data collected using portable computing device 200, the inspection data 804 may be downloaded from portable device 200 to client system 104 through client conduit module 620 (e.g. during synchronization), and then transferred to server 106 over a communications interface, such as WAN 116. Inspection data 804 may be used by server 106 to generate reports, and may also be used to generate GIS data 806 to create a visual mapping of the inspected target infrastructure and any related infrastructure features. Inspection data 804 may also include historical data related to the infrastructure and related features, such as condition assessment data. For example, the record identification data may include the location and characteristics of a roof drain (e.g. collected pursuant to an inspection of the roof drains for blockage from debris). Accordingly, the inspection data 804 may also include the assessed condition of the roof drain.

GIS data 806 may be data created from inspection data 804, and may comprise a representation of objects (e.g. infrastructure components and features) measured using, for example, GPS receiver 206. The data could represent an area, a line, or a point, which may be visually used to depict a graphical representation of the measurement. For example, if the feature measured during an inspection (e.g. using GPS receiver 206) is a measure of area, the points at the vertices of the shape are converted to a polygon shape, and the representation of this shape may be stored as GIS data 806. If the feature measured using GPS receiver 206 is a linear measurement, the points at the vertices are converted to a line/polyline feature, and the representation of this line may be stored as GIS data 806. The GIS data 806 can then be used to visualize the inspected object in a spatial environment such as through a GIS interface, which may be web-based.

Reporting data 808 may be stored in the database to facilitate the creation of on-demand reports via the data reporting module. Reporting data 808 can be derived from any other data in the database. Example reporting data 808 may be, for example, a compilation of all the existing inventory of roofing components associated with a roof and all recorded deficiencies associated with those components. Such data may be used to generate a roof condition assessment report. Another example of a report generated from reporting data 808 may be a graphical depiction or listing of all roof leaks recorded for a subject roof over a specific time period. The report may include the location of the leak on the roof, a picture depicting the condition of the roof component at the time of the roof leak, a description of the repair performed to stop the leak, and a picture of the roof component after a repair is completed.

Deficiency correction data 810 may represent corrective work items for addressing observed infrastructure deficiencies. The deficiency correction data 810 addresses the major classes of corrections: maintain, repair, demolish, and replace. For example, in the case of a roof system that has accumulated several layers, a common deficiency is a roof blister that may be caused by water or water vapor penetrating between the roof layers. Blisters can cause accelerated deterioration of the roof, eventually requiring replacement of the roof. One potential maintenance correction that can be applied to blisters is cutting out the portion of the roof where the blister occurs and applying an asphalt based mastic to reattach the roof membranes. A repair correction item may be the removal of that roof section and the application of a new "patch" section. If the severity of blisters on the roof is significant, then a roof membrane demolition and total membrane replacement might be indicated. Accordingly, in this instance, the deficiency correction data is correlated to the type of deficiency and also the severity of the deficiency.

BPM data 812 may be stored in the database to facilitate product selections for infrastructure repair or replacement projects. For example, BPM data 812 may include, but is not limited to, part numbers, part identifiers, part descriptions, and prices for a particular product. In some embodiments, the BPM data may also include configuration logic for providing compatibility rules for the combination of products that can produce a complete and compatible roofing system. For example, certain types of rigid insulation can be applied directly to metal roof decks while others can not. Similarly, certain types of flashing systems are compatible with EPDM roof membrane systems while others are not. The configuration logic compatibility rules may provide compatible choices or combinations of roof components while preventing a user from selecting incompatible components. BPM data 812 may follow a generic field schema, with additional custom fields as required by each BPM that provides such product data. BPM data 812 may be updated from time to time to keep the building product manufacturer data current with pricing trends and as new products are introduced to market.

User data 814 may include data used to provide varying levels of access to all the data in the database. Accordingly, data such as a user name and an associated level of access or list of permissions may be included within the user data. The permissions may identify which users have permission to login, view reports, view drawings, etc. Additionally, user data 814 may include user profile related information such as the costs of roofing products, such that cost estimates of their product selections can be generated automatically. For example, manufacturers and distributors of roofing products offer different pricing for those products to roofing contractors depending on the volume/quantity of products being purchased and special discount programs. These pricing strategies are thus customized for a particular entity, and the pricing is often confidential and proprietary. Thus, permissions associated with a user identification, such as the login name, may control access to the products and associated pricing for that particular user.

Looking back to FIG. 7, in general, external interface module 724 provides an interface to allow third parties (e.g. manufacturers and distributors of roofing products) to update BPM data 812 stored in database 800. In one embodiment, external interface module 724 may provide an application program interface (API) providing the capability for third parties to design custom systems for interacting with server system 106. Thus, external interface module 724 can provide such third party systems with the ability to: upload BPM data 812 into database 800, enable secure access to BPM data 812 to authorized users, to allow for maintenance activities of BPM data 812 contained in database 800, and to provide mappings from specific roof inspection conditions, deficiencies, and remedies to recommended products identified within BPM data 812. These mappings provide associations between particular deficiencies or needs found during an inspection, with a product that can solve the deficiency or provide for the identified need. The maintenance activities enabled by external interface module 724 may include creating, updating, and deleting the BPM data 812, and the maintenance may be controlled according to user permissions. For example, a respective manufacturer's user permissions may be set to only allow the maintenance of the data associated with that respective manufacturer.

In some instances, a third-party may use existing automated cost estimating software. The API provided by external interface module 724 may be used to interface that estimating software with database 800 to extract any information in the database, such as information collected during an assessment of the infrastructure. For example, the assessment information extracted from the database 800 can be used by the third-party's cost estimating software for providing cost estimates.

As described above, client system 104 may access server system 106 through server interface module 720. Server interface module, may, for example, be a WWW server. Although access to server system 106 may be described as being performed through a WWW server, access could be provided through any number of servers that allow the capability for associated information to be accessed by and relayed to, a client system.

Server interface module 720 provides the ability for a number of client systems 104 to access data stored in database 800 (via server database module 722). Client system 104 may access server system 106 using an appropriate interface. As described above with respect to desktop application module 622, one such suitable interface on client system 104 that may be used for accessing server interface mode 720 is an Internet browser. Server interface module 720 may also enable a number of other functions, which may be functionally described with respect to a number of respective submodules as depicted in FIG. 9.

Figure 9:
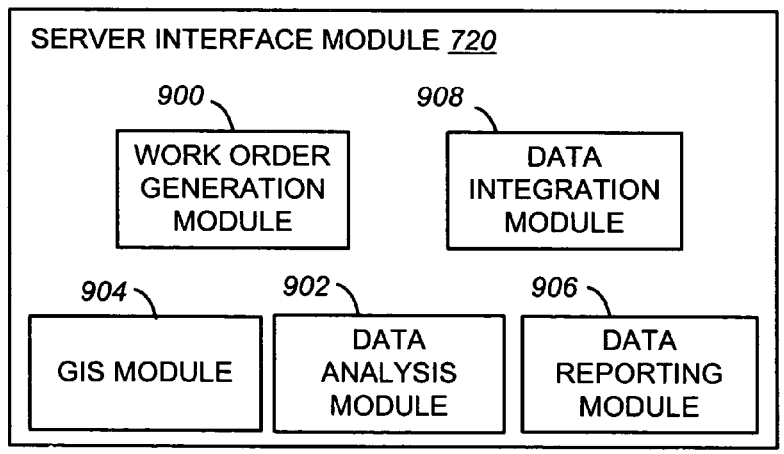
FIG. 9 is a block diagram of the server interface module of FIG. 7.

FIG. 9 depicts a block diagram of server interface module 720. As depicted, server interface module 720 may, among other functions, include the functionality of each of modules 900-908. Specifically, in the embodiment of FIG. 9, server interface module 720 may include work-order generation module 900, data analysis module 902, data reporting module 906, and data integration module 908, each of which are discussed in more detail below.

In practice, a user of client system 104 may generate and assign a work order to be completed by an inspector, on-site, at an identified target. For the case of infrastructure inspections, the user of client system 104 may enter the work order at the request of a client such as a property management company, home owner, or other party interested in receiving an inspection of their infrastructure.

Accordingly, work order generation module 900 is configured to generate work orders for a particular target 108 based on the input of a user through the desktop application module 622 on client system 104. A work order may include an inspection plan for one or more targets 110 for the assigned inspector. Like a work order, the inspection plans may also be created on server system 106 by a user accessing interface server module 720 through the desktop application module 622. The resulting work order(s) may be assigned to a portable computing system 200 (which may also correspond to a particular inspector) and stored in database 800 through server database module 722. The work order may be transferred to client system 104 from server system 106 at a predetermined time of day, or upon a synchronization of the assigned portable computing system 200.

The work order may also contain the following non-exhaustive list of information which may be helpful or required to carry out the inspection in the context of infrastructure reporting: a site and/or target identifier, address, city, state, and/or other identifying and locating information of the site and/or target; the infrastructure(s) at the site that should inspected (e.g. a roof, a door, etc.); the types of measurements and/or inspections to perform for a particular infrastructure (e.g. these may be different depending on, for example, whether the inspection is pursuant to warranty work, a condition assessment, leak detection and repair, or overall asset management tracking, for example); and the order in which measurements or other tasks should be performed.

In the case of roof inspections, for example, the work order may define the location of the building, an identification of the roof to be inspected, the types of the measurements to be taken (e.g. surface area of a roof, the quantity and/or surface area of vents, air handlers, and other objects located on the roof), the types of inspections to be performed (e.g. assessments of roof condition, assessments of roof accessories such as vents, flashing, etc., and the location and associated measurements of defects, such as ponds), the order of the measurements to be taken, the images to be recorded, the audio information to be recorded, the dimensional measurements to be taken, and/or bar codes to be scanned.

Data reporting module 906 generates reports based on, in part, the data collected during an inspection of the infrastructure. A user of client system 104 accesses data reporting module 906 of server system 106 via the desktop application module 622. Data reporting module 906 provides a number of user interactive interfaces for generating a desired report. Although standard report formats are available, the interactive interfaces may allow the user to create a new report format or customize the standard formats. The reports generated by data reporting module 906 may be saved electronically, printed, or delivered to a desired recipient via e-mail or other electronic transmission protocol.

Although reports may be customized, in general, there are four general categories of reports that may be generated by data reporting module 906. Namely, an assessment report, a project report, a proposal report, and a maintenance report.

An assessment report may include a summary of the inspected infrastructure and a listing of the deficiencies identified during inspection data collection. Such a report may include a visual depiction such as a map or other composition of the inspected infrastructure. For each deficiency, the user generating the report may, for example, include deficiency descriptions, proposed remedies, and the digital images linked to each deficiency.

A project report provides specification details and work items for repairing or replacing the infrastructure in accordance with the conditions identified in the assessment report. The project report links the inspection data to either generic or specific manufacturer products and prices. For example, if the user generates a report directed to repairing the deficiencies in an infrastructure item, the user selects each deficiency and chooses a desired product from a predefined list of manufacturer products that resolve the deficiency. Similarly, in the case of replacement of an infrastructure item, data reporting module 906 may use the inspection data to provide the user with a predefined list of manufacturer's products that may be used for replacement. The user selects a desired product from the list and assigns a quantity to that product. Quantities could, for example, include counts (e.g. a number of roof drain covers), lengths (e.g. linear feet of metal flashing) or areas (e.g. square footage of roofing membrane). In one embodiment, each infrastructure item identified as a deficiency or replacement may be listed without prices. Such a report may be provided in a spreadsheet format, for example. Accordingly, a user can use the listing to price the work items using their own cost information or automated estimating system.

A proposal report summarizes the conditions observed in the assessment report, work items identified in the project report, and pricing information. The pricing information may be totaled to provide a project estimate for a prospective client.

A maintenance report reflects the maintenance work tasks that will be performed to maintain an existing roof. These maintenance work tasks may be, for example, caulking, cleaning roof drains, minor repair to flashing and membrane seams, and other similar items. The maintenance report may include the quantities and frequency of the work tasks (e.g. clean ten drains every two months).

Server interface module 720 may also include a Geographic Information System (GIS) module 904 to generate GIS data 806 for a particular target. As is known, GIS generally refers to information systems that use spatial information for providing "mapping" capabilities. However, more than generating a map, GIS is capable of linking associated attributes and characteristics of an object to its geographic location. Unlike conventional paper maps, GIS maps can be combined with layers of information related to the object.

In one embodiment, GIS module 904 may be implemented using a number of available GIS engines. For example, in one embodiment, GIS module 904 is implemented using the ArcGIS suite of GIS software, available from ESRI (Environmental Systems Research Institute), Redlands, Calif. GIS module 904 provides functionalities such as mapping, web-enablement, coordinate system projection and transformation, and the conversion of mapping data to file formats such as CAD.

Accordingly, GIS data 806 may be used by GIS module 904 to automatically generate a depiction of the target, including any objects such as infrastructure components and related infrastructure features, as depicted in FIG. 5. In addition, GIS module 904 may associate additional information related to the infrastructure depicted in the image. That is, each of the depicted objects (a roof, an air handler, a defect, etc.) can provide for the storage and access of associated information. For example, each object may include: location information that is recorded by the GPS receiver 206, images captured by the camera 204, and/or digital audio related to the object. This information is stored as GIS data 806, and represents a number of attributes associated with the objects.

Various images can be generated by GIS module 904 based on the stored attributes. For example, in one image, infrastructure defects can be depicted based on severity level (e.g. via color coding or other identifying information). In another example, for inspection data collected related to the inspection of a roof, the roof protrusions can be depicted, which may include the depiction of drains, vents, and heating, ventilating, and air-conditioning (HVAC) units.

GIS module 904 provides the capability to generate custom GIS maps based on the user's requirements. For example, in practice, to generate a drawing similar to that depicted in FIG. 5, a user may access GIS module 904 through the desktop application module 622 through WAN 116 (e.g. through the Internet). GIS module 904 may provide for the display of one or more graphical interfaces (e.g. through desktop application module 622) to request user input for customizing a desired image. Using the desired features selected by the user, GIS module 904 generates the image from the GIS data. Once the image has been generated, GIS module 904 may also be configured to provide the capability to export the image into other electronic image formats such as, but not limited to, computer-aided drafting (CAD) formats, JPEG, GIF, and TIFF.

Data analysis module 902 provides the functionality to analyze inspection data to provide specific recommendations for maintenance, repair, refurbishment or replacement of infrastructure or infrastructure feature. The data analysis module includes standards data and predictive logic capable of calculating the life-cycle costs, under any number of scenarios, for the maintenance, repair or replacement. For example, if the infrastructure is a roof, the standards data might indicate that the average functional life of a 60 mil EPDM roof in the Southeast U.S. is fifteen years. A project might involve a 12 year old roof that has 15% seam splits and decay. The data analysis module analyzes the assessed information with respect to the standards data to provide a comparison of the life-cycle cost of repairing the existing roof to extend its life for 3-5 more years (and potentially replacing the roof at that time) versus replacing the roof system immediately.

Data integration module 908 provides the integration of data into, and out of, the server 106 from external computer systems, such as third-party computer systems. This may include the maintenance, update and input of new data for building products, inspection standards, remedy selection and all other standards data included in the server database 800 and any associated data to be used by the field reconnaissance system 102.

The Inspection Process

Now that recording and reporting system 100 has been described, an exemplary inspection 1000, using recording and reporting system 100, is provided. Although certain described embodiments may be described in the context of a roof inspection, it should be understood that other targets and associated features could be the subject of the inspections. The exemplary inspection method can be used with respect to, for example, warranty validation, a roofing contractor repair/replacement inspection and estimate, and infrastructure consultant inspections and recommendations.

Figure 10:
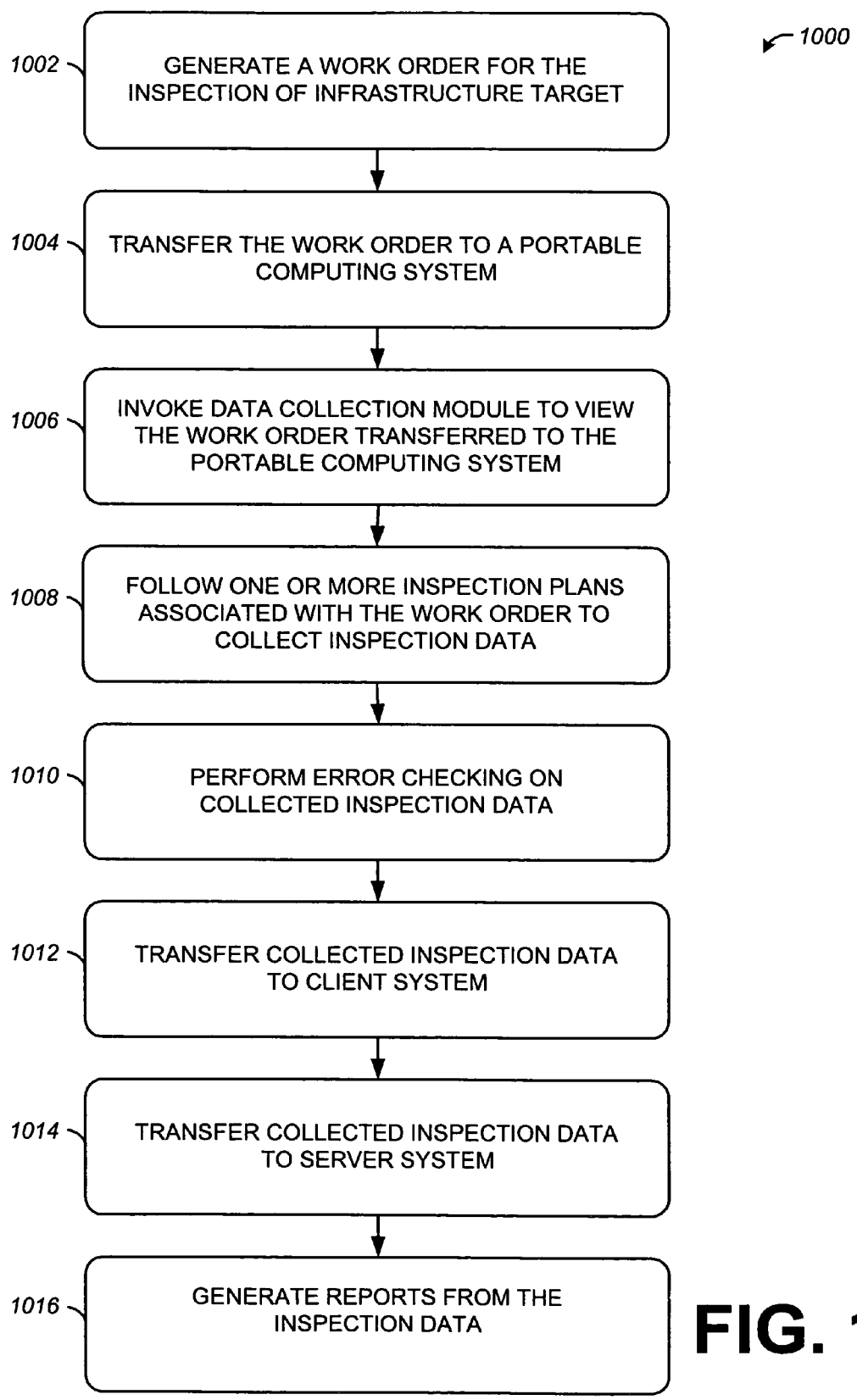
FIG. 10 is a flow diagram depicting one exemplary method employed by the recording and reporting system of FIG. 1.

FIG. 10 depicts a flow diagram which may be followed for the inspection of infrastructure components, such as a roof. Any process descriptions, steps, or blocks in flow diagrams should be understood as potentially representing modules, segments, or portions of code which include one or more executable instructions for implementing specific logical functions or steps in the process, and alternate implementations are included within the scope of the preferred embodiments of recording and reporting system 100 in which functions may be executed out of order from that shown or discussed, including substantially concurrently or in reverse order, depending on the functionality involved, as would be understood by those reasonably skilled in the art.

During the inspection, inspection data is recorded and can be used to generate reports such as line drawings, condition assessment reports, proposals, and project reports as described above. For example, the inspection may be performed in the context of inspections completed by roofing contractors, roofing consultants and building product manufacturer warranty inspectors.

At block 1002, a work order is generated for the inspection of one or more infrastructure targets based on the input of a user. Specifically, server interface module 720 may provide a number of interactive interfaces displayed through the desktop application module 622 on client system 104. Through the interactive interfaces, the user associates one or more inspection plans for an infrastructure target located at a specified site. The inspection plans themselves may be predefined, or may be user customized. Through the interface, the user may also enter any pertinent information for the work order, such as, but not limited to a site and/or target identifier, address, city, state, and/or other identifying and locating information of the site and/or target; or the infrastructure(s) at the site that should inspected (e.g. a roof, a door, etc.). The resulting work order(s) may be assigned to a portable computing system 200 (which may also correspond to a particular inspector) and stored in database 800 through server database module 722. The work order may be transferred to client system 104 from server system 106 at a predetermined time of day, or upon a synchronization of the assigned portable computing system 200.

At block 1004, the work order generated in block 1002 is transferred to an assigned portable computing system 200 over a bidirectional communications interface. For example, the transfer may occur upon the portable computing system 200 being synchronized with client system 104. As discussed above, in one embodiment, the work orders may have already been transferred from server system 106 to client system 104 at a predefined time. In such an embodiment, the work orders are transferred from client system 104 to portable computing system 200. In another embodiment, the synchronization may include transferring the work orders from database 800 associated with server system 106. The synchronization process may further include the transfer of any inspection data, if any, to client system 104 and/or server system 106. That is, the data collected with the portable computing system 200, pursuant to the execution of prior work orders, may be transferred from the portable computing device 200 to client system 104 and/or server system 106, and stored in a respective database.

At block 1006, the work order transferred to the portable computing system 200 is viewed by invoking data collection module 320. Specifically, data collection module 320 may be invoked to display relevant work order information such as the project name, identification number, address of the associated site(s) and/or target(s), the type of inspections to be performed, and the contact details for the building manager/owner. Inspection data collection module 320 may display a list of sites 110 associated with the downloaded work orders. The inspector may use the location information (address, GPS measurements, etc.) to arrive at each site destination.

Once the inspector has arrived at the site 110, at block 1008, the inspector follows the inspection plan(s) associated with the work order to collect the inspection data. There may be one or more inspection plans associated with any number of infrastructure targets associated with the site 110. For example, the inspection plan may first request that the inspector take a photograph of the site. For example, in the case that the site is a designated building, the inspector may take a photograph of the building from ground level. This photograph may then be linked to other data related to the building (e.g. an identifier, the address, the building manager, etc.).

The inspection plan may then request that the inspector perform a number of measurements and/or observations of one or more infrastructure components. For example, in the case that the infrastructure component is a roof, the inspection plan may request that the inspector walk the roof perimeter to determine the total area and shape of the roof using GPS receiver 206, as described with respect to FIG. 5. The inspection plan may also request a number of other components associated with the roof be identified. The types of measurements for each infrastructure component may depend on the type of the component. For example, a gutter located on one side of a roof may be represented by a linear measurement, and an HVAC system may be represented by an area measurement. Defects that may require an area measurement include ponds or large blisters. Defects associated with linear measurements may be seam splits or flashing defects, for example. Damage to scuppers or drains may be identified with point measurements.

In addition to inspecting the target for defects, the inspector may record data that is used for estimating the cost of repair or replacement of the target (or portions thereof). For example, the inspector may provide the quantities and types of materials needed for the repair and/or replacement of the infrastructure. In the case of a roof, the inspector may determine, for example, the type(s) of roof drains on the roof, the quantity of drains on the roof, and the installation method used to install the drains and drain covers. This information may be collected during a roof-top inspection process. However, additional details could be added to the inspection data once the data is transferred from the portable computing system to another computing system, such as the client or server system.

In the case that there are multiple levels of roofs, or multiple types of roof materials associated with a single building, each section of roof may be assessed individually. Each type or level of roof, may, for example, be assessed as a different target associated with the site (the building). Roof sections located under overhangs may not be capable of measurement using GPS receiver 206 and may require the use of other measurement instruments. The inspection data collection module 320 of personal computing system 200 may be configured to display fields for identifying and manually recording measurements for these areas if needed.

The inspection data is recorded and stored within portable computing system 200. For example, such inspection data may include, but is not limited to, measurements, observations, photographs, audio recordings, and test results. The measurements and observations may include the data used to determine costs for the repair and/or replacement of the inspected target.

At block 1010, a number of error checks may be performed on the collected inspection data. For example, some inspection data may be compared with predefined acceptable ranges, with inspection data falling outside the range being flagged as a potential error. Such error checking can assure that reliable data is recorded before the inspector leaves the field. This immediate feedback may, for example, assist an inspector in determining that measurement tools (e.g. auxiliary components 202-208) may need calibration and repair, saving the inspector from valuable time collecting unreliable data.

After the roof inspection data has been collected and roof defects have been recorded (i.e. photographed using camera 204, located using GPS receiver 206, and assessed using options provided by inspection data collection module 320) the inspector may complete any other assigned work orders.

At block 1012, once the appropriate inspection data has been recorded, the inspector may synchronize portable computing system 200 with client system 104, thereby transferring inspection data to client system 104. Any work orders assigned to the portable computing device 200 may also be uploaded to the portable computing system during such synchronization.

At block 1014, the inspection data may be further transferred to server system 106, and stored within database 800. At block 1016, reports may be generated by server system 106 based, in part, on the inspection data. The reports generated, which have already been described in detail above, may be user selectable and may depend on the purpose of the inspection and the type of information to be reported.

Accordingly, systems and methods for recording and reporting have been disclosed. The systems and methods allow for the efficient and reliable collection of data related to infrastructure inspections. The recorded data can be stored in a central location and used for the generation of reports. The data can be associated with information about products that can be used provide the replacement or repair of the infrastructure. The reports can be used to determine the costs associated with repair and/or replacement of the inspected infrastructure.

It should be emphasized that many variations and modifications may be made to the above-described embodiments. All such modifications and variations are intended to be included herein within the scope of this disclosure and protected by the following claims.

Therefore, having thus described the invention, at least the following is claimed:

1. A roof inspection system for a recording and a reporting of data related to a roof component, the roof inspection comprising:
    a server located at a first location;
    a client located at a second location, the client having a client-server communications interface for communication with the server; and
    a portable computing device for collecting inspection data at a third location according to an inspection plan, the third location being remote from the second and first locations, wherein the portable computing device further includes:
        means for receiving signals for determining the geographic position of the portable computing device;
        means for determining the geographic position of the portable computing device from the signals, the geographic position of the portable computing device forming at least a portion of the inspection data collected according to the inspection plan;
        a memory for storing the inspection data; and
        a bidirectional communications interface for transmitting the inspection data to the client and receiving the inspection plan from the client;
        wherein the portable computing device is configured to associate the geographic position with a roof component.

2. The system of claim 1, wherein the server is configured to:
    receive the inspection data from the client over the client-server communication interface; and
    calculate a dimensional measurement of the roof component based at least in part on the geographic position.

3. The system of claim 1, wherein the server is configured to:
    receive the inspection data from the client over the client-server communications interface; and
    generate a report from the inspection data.

4. The system of claim 3, wherein the inspection data further includes assessment data collected according to the inspection plan, and the server is further configured to analyze the assessment data by comparing the assessment data to standards.

5. The system of claim 3, wherein the server is configured to generate geographic information system (GIS) data based at least in part on the inspection data for creating a visual mapping of a target inspected according to the inspection plan.

6. The system of claim 5, wherein the server is configured to generate geographic information system (GIS) data based at least in part on the inspection data for depicting the location of at least one roof component inspected according to the inspection plan, the depiction of the location of the roof component being depicted with respect to the visual mapping of the target.

7. The system of claim 1, wherein the inspection plan defines an inspection of a roof and the inspection data identifies an assessed condition of at least one drain on the roof.

8. The system of claim 7, wherein the server is configured to:
    receive the inspection data from the client over the client-server communications interface;
    store the assessed condition of the at least one drain in a server database of historical condition assessments; and
    analyze the historical condition assessments to predict the frequency of inspection or maintenance of the drain.

9. The system of claim 1, wherein the inspection plan defines an inspection of infrastructure selected from the group consisting of: a roof, a paved area, a utility distribution system, a lawn, a tree, a shrub, a flower, or a retaining wall.

10. The system of claim 1, wherein the portable computing device further comprises an auxiliary data collection device selected from the group consisting of: a bar code scanner, a digital camera, and a digital voice recorder.

11. A roof inspection system comprising:
    a portable computing device that can be transported between a first location and a second location, the second location being remote from the first location;
    a server system located at a third location, the third location being remote from the second and first locations; and
    a client located at the first location, the client having a client-server communications interface for communication with the server system;
    wherein the portable computing device includes:
        at least one auxiliary component for collecting roof inspection information at the second location according to an inspection plan executed by the portable computing device, the roof inspection information collected by the at least one auxiliary component including geographic positions defining a geometric shape of at least a portion of the roof and a geographic position of at least one component associated with the roof; and
        a bidirectional communications interface for transferring the roof inspection information from the portable computing device to the client over the bidirectional communications interface at a time when the portable computing device is located at the first location.

12. The system of claim 11, wherein
the client is configured to:
    receive the roof inspection information from the portable computing device; and
    transfer the inspection information to the server system.

13. The system of claim 11, wherein one of the second computing device or the server system is configured to determine an area of the portion of the roof based at least in part on the geographic position.

14. The system of claim 13, wherein the at least one auxiliary component comprises a global positioning system (GPS) receiver for receiving signals used to determine the geographic position.

15. The system of claim 11, wherein the roof inspection information collected by the at least one auxiliary component further includes an identification of the at least one component associated with the roof, and the portable computing system is configured to associate the identification of the at least one component associated with the roof with an assessment of the condition of the at least one component associated with the roof.

16. A method for inspecting an infrastructure including a roof component, the method comprising the steps of:
    collecting inspection information during an infrastructure assessment pursuant to an inspection plan executed by a portable computing device, the infrastructure assessment conducted at a first location, the step of collecting inspection information further including:
        receiving at least one signal;
        determining the location of the portable computing device based on the received signal;
        identifying a roof component according to a bar code;
        associating the location of the portable device with the roof component; and storing the location and an identification of the associated roof component in memory; and transferring the inspection information from the portable computing device to a second computing device.

17. The method of claim 16, wherein the step of transferring the inspection information from the portable computing device further comprises:

transferring the inspection information from the portable computing system to a server computing system.

18. The method of claim 16, further comprising:

receiving the inspection information from the portable computing device; and generating a graphical representation of the roof component from the inspection results.

19. The method of claim 18, further comprising:

displaying the graphical representation of the roof component.

20. A method for inspecting infrastructure including a roof component, the method comprising the steps of:

collecting inspection information during an infrastructure assessment pursuant to an inspection plan executed by a portable computing device, the infrastructure assessment conducted at a first location, the step of collecting inspection information further including:

assessing the condition of a roof component;

identifying the roof component according to a bar code;

associating the assessment with the identification of the roof component; and storing the assessment and identification of the roof component in memory associated with the portable computing device;

transferring the inspection information from the portable computing device to a second computing device;

storing the assessed condition of the roof component in a database associated with the second computing device, the database including historical condition assessments of the roof component; and analyzing the historical condition assessments to predict the frequency of inspection or maintenance of the roof component.

21. A roof inspection system for inspecting infrastructure including a roof component, the system comprising:

a portable computing device having logic configured to:

record an assessment of a condition of a roof component pursuant to an inspection plan;

identify the roof component according to a bar code;

associate the assessment with the identification of the roof component;

store the assessment and the identification of the roof component in a memory associated with the portable computing device; and transfer the assessment and identification of the roof component from the memory associated with the portable computing device to a second computing device located at a second location;

wherein the second computing device includes:

a database of historical condition assessments of the roof component; and logic configured to:

store the assessment in the database of historical condition assessments; and analyze the historical condition assessments to estimate a frequency of maintenance needed for the roof component.

* * * * *